United States Patent
Beuermann et al.

(10) Patent No.: US 8,191,903 B2
(45) Date of Patent: Jun. 5, 2012

(54) GAS SPRING SYSTEM HAVING MULTI CHAMBER GAS SPRINGS

(75) Inventors: Carsten Beuermann, Stuttgart (DE);
Jochen Goetz, Jettingen (DE);
Eberhard Kaus, Boeblingen (DE)

(73) Assignee: Daimler AG, Stuttgart (DE)

( * ) Notice: Subject to any disclaimer, the term of this patent is extended or adjusted under 35 U.S.C. 154(b) by 145 days.

(21) Appl. No.: 12/681,739

(22) PCT Filed: Sep. 6, 2008

(86) PCT No.: PCT/EP2008/007311
§ 371 (c)(1),
(2), (4) Date: Jul. 15, 2010

(87) PCT Pub. No.: WO2009/043423
PCT Pub. Date: Apr. 9, 2009

(65) Prior Publication Data
US 2010/0276852 A1    Nov. 4, 2010

(30) Foreign Application Priority Data

Oct. 4, 2007  (DE) ........................ 10 2007 047 410
Oct. 20, 2007 (DE) ........................ 10 2007 050 187

(51) Int. Cl.
*B60G 17/016* (2006.01)
(52) U.S. Cl. ...................................... 280/5.508; 701/37
(58) Field of Classification Search ................ 188/298, 188/314, 318, 322.21; 267/64.15, 64.17, 267/64.19, 64.27; 280/5.506, 5.507, 5.508, 280/5.51, 5.512, 5.513, 5.515, 124.157, 124.16, 280/124.161, 124.162; 701/37, 38
See application file for complete search history.

(56) References Cited

U.S. PATENT DOCUMENTS

| | | | | |
|---|---|---|---|---|
| 4,206,934 A | * | 6/1980 | McKee | 280/5.508 |
| 4,655,440 A | * | 4/1987 | Eckert | 267/64.11 |
| 4,903,983 A | * | 2/1990 | Fukushima et al. | 280/5.503 |
| 4,967,360 A | * | 10/1990 | Fukunaga et al. | 701/37 |
| 5,058,017 A | * | 10/1991 | Adachi et al. | 701/38 |
| 5,156,645 A | * | 10/1992 | Tsukamoto et al. | 280/5.501 |

(Continued)

FOREIGN PATENT DOCUMENTS

DE           103 36 342 A1    2/2005
(Continued)

OTHER PUBLICATIONS

International Search Report dated Nov. 20, 2008 including partial translation, PCT/ISA/220 and PCT/ISA/237 (Nineteen (19) pages).

*Primary Examiner* — Joseph Rocca
(74) *Attorney, Agent, or Firm* — Crowell & Moring LLP

(57) ABSTRACT

A gas spring system of a vehicle includes a multi-chamber gas spring associated with each vehicle wheel. Each multi-chamber gas spring comprises a main chamber and at least one auxiliary chamber connectable to the main chamber, such that the spring rigidity of the multi-chamber gas springs can be changed. A control device determines a target axle rigidity as a function of a guide lateral acceleration and adjusts the target rigidity. The spring rigidity of the multi-chamber gas spring located on an inner side of the vehicle (relative to a curve traversed by the vehicle) is first changed. The spring rigidities of the multi-chamber gas springs of a vehicle axle are changed in stages in an alternating fashion.

13 Claims, 3 Drawing Sheets

U.S. PATENT DOCUMENTS

| | | | |
|---|---|---|---|
| 5,183,127 A * | 2/1993 | Kageyama et al. | 180/197 |
| 5,396,423 A * | 3/1995 | Fujimura et al. | 701/38 |
| 7,240,906 B2 * | 7/2007 | Klees | 280/5.502 |
| 7,779,974 B2 * | 8/2010 | Timoney et al. | 188/318 |
| 2004/0256831 A1 * | 12/2004 | Sharp | 280/124.157 |
| 2006/0108749 A1 * | 5/2006 | Kim | 280/5.508 |
| 2006/0219503 A1 * | 10/2006 | Kim | 188/282.2 |

FOREIGN PATENT DOCUMENTS

| | | |
|---|---|---|
| DE | 10 2007 006 034 A1 | 8/2008 |
| EP | 0 166 702 A2 | 1/1986 |
| EP | 1 659 007 A2 | 5/2006 |
| EP | 1 707 407 A1 | 10/2006 |
| EP | 1 757 473 A2 | 2/2007 |
| JP | 1-182108 A | 7/1989 |
| JP | 7-215035 A | 8/1995 |
| JP | 8-99516 A | 4/1996 |
| JP | 9-39535 A | 2/1997 |
| WO | WO 02/068229 A1 | 9/2002 |

* cited by examiner

GAS SPRING SYSTEM HAVING MULTI CHAMBER GAS SPRINGS

This application is a national stage of PCT International Application No. PCT/EP2008/007311, filed Sep. 6, 2008, which claims priority under 35 U.S.C. §119 to German Patent Application Nos. 10 2007 047 410.7, filed Oct. 4, 2007 and 10 2007 050 187.2, filed Oct. 20, 2007, the entire disclosures of which are herein expressly incorporated by reference.

BACKGROUND AND SUMMARY OF THE INVENTION

The invention relates to a gas spring system for a vehicle.

Such a gas spring system is for example known from German patent document DE 103 36 342 A1. The gas spring system described there has an air spring with a main air chamber to which can be coupled a first additional air chamber and/or a second additional air chamber via a guide system and a valve arranged in the guide system. That is, the main air chamber can be connected to one or two of the additional air chambers in a fluidic manner or can separated from these in a fluidic manner, so that the effective total volume of the air spring, and thereby its spring rigidity, can be changed. The chassis characteristic can be varied in dependence on the effective total volume of the air spring by means of this gas spring system. The lift behavior, the pitch behavior and the roll behavior of the vehicle can be influenced thereby.

One object of the present invention is to provide a gas spring system which optimizes the drive behavior of the vehicle.

This and other objects and advantages are achieved by the gas spring system according to the invention, which includes a multi-chamber gas spring with a main chamber and at least one auxiliary chamber that can be connected to the main chamber, at least on one vehicle axle at the vehicle wheels. A guide value that is dependent on the longitudinal speed and the steering angle of the vehicle serves as basis for calculation of a target rigidity by a control device. The axle rigidity at the vehicle axle equipped with the multi-chamber gas springs is then adjusted corresponding to the target axle rigidity. The guide value, which depends on the steering angle and the longitudinal vehicle speed, precedes in time the actual lateral acceleration of the vehicle. The axle rigidity can thereby be adjusted to the determined target axle rigidity, before the actual lateral acceleration on the vehicle takes effect. This chronological advance serves to adjust the vehicle to the changing actual lateral acceleration already at the time of the steering when passing through a curve and to optimally adapt the drive-dynamic behavior of the vehicle for passing through a curve.

In a first embodiment of the invention, it is further provided that the control device initially changes the spring rigidity of the multi-chamber gas spring, which is arranged on the inner curve side of the vehicle. Which vehicle side represents the inner curve side is determined by the steering angle or the guide value depending on the steering angle. The possibility results thereby to increase the spring rigidity of the multi-chamber gas spring on the inner curve side and the extension of the springs of the multi-chamber gas spring on the inner curve side when turning the vehicle. The curve position and in particular the roll position of the vehicle in the curve is thereby improved considerably.

With a second solution according to the invention, it is suggested additionally or alternatively to adapt the spring rigidities of the multi-chamber gas springs of this vehicle axle in stages in an alternating fashion to the determined target rigidity when adapting the axle rigidity. If for example the axle rigidity is to be increased for adaptation to the target axle rigidity, the spring rigidity of the one multi-chamber gas spring is first increased by one stage, the spring rigidity of the respective other multi-chamber gas spring of this vehicle axle is subsequently increased by one stage. This change in stages in an alternating fashion of the axle rigidity for the adaptation to the target axle rigidity takes place in as many stages as necessary to achieve the target axle rigidity. It has emerged that the change in stages in an alternating fashion of the spring rigidities of the multi-chamber gas springs of a vehicle axle is very comfortable for the vehicle occupants.

Advantageously, a multi-chamber gas spring is associated with each vehicle wheel. The axle rigidities of both vehicle axles can be changed in this manner, whereby an axle load distribution between the front axle and the rear axle can be adjusted in a fixed manner or dependent on parameters.

It is furthermore advantageous if each multi-chamber gas spring has several auxiliary chambers and in particular three auxiliary chambers with gas volumes having different sizes, which can respectively be connected to a respective connection valve via a separate connection channel in a fluidic manner or can be separated from the main chamber in a fluidic manner. The effective gas volume of the multi-chamber gas spring can thus be changed in several stages, so that the spring rigidity of the respective multi-chamber gas spring can also be changed in several switching stages of different size. Due to the fact that a separate connection valve sits in each connection channel, a large degree of freedom is present with the arrangement of the auxiliary chambers and with the arrangement of the connection channels between the auxiliary chambers and the main chamber.

The control device can calculate a guide lateral speed from the longitudinal vehicle speed and the steering angle, which lateral speed serves as a guide value for determining the target axle rigidity. The guide lateral acceleration can be determined in a very simple manner and serves as a measure for the drive-dynamic influence of the vehicle during passing through a curve. The guide lateral acceleration thereby precedes the actual lateral acceleration which effectively acts on the vehicle, so that a chronological advance is achieved when adjusting the axle rigidity.

It is further possible that the control device determines the target axle rigidity on the basis of the guide value with the help of a characteristic field. This is particularly advantageous if the target axle rigidity is determined in addition to the guide value on the basis of at least one further parameter. The target axle rigidity can for example also be determined in dependence on parameters, as vehicle state parameters and/or environmental parameters. The target axle rigidity can be adapted to the respective drive situation in an even more exact manner.

A brake pedal actuation parameter and/or a drive pedal actuation parameter and/or spring paths and/or spring speeds and/or a wheel slip parameter and/or the steering angle speed are for example considered as vehicle state parameters. The mentioned parameters are usually available with modern vehicles and can be transferred to the control device via a vehicle data bus system.

The road surface friction value can be used as an environmental parameter, so that it can be estimated if the determined guide value, in particular the guide lateral acceleration can actually develop due to the road surface friction value which is present. The maximum amount of the guide value can for example be determined in dependence on friction and the guide value can be limited to this maximum amount.

It is further advantageous if the control device compares the longitudinal vehicle speed to a first speed threshold, and, if the longitudinal vehicle speed exceeds the first speed threshold, fixes a minimum front axle rigidity which is larger than the smallest front axle rigidity, and a maximum rear axle rigidity for the rear axle rigidity which is smaller than the largest rear axle rigidity. Due to these limitations of the axle rigidities at the front or rear axle, the drive stability is ensured with longitudinal speeds above the first speed threshold, that is, in particular with very large longitudinal vehicle speeds as they occur for example when driving on the highway.

It is additionally advantageous if the control device compares the longitudinal vehicle speed to a second speed threshold and, if the longitudinal vehicle speed falls below the second speed threshold, fixes a maximum front axle rigidity for the front axle rigidity which is smaller than the largest possible front axle rigidity, and fixes a minimum rear axle rigidity for the rear axle rigidity, which is larger than the smallest rear axle rigidity. The agility of the vehicle can be kept sufficiently high by this measure during steering with longitudinal speeds below the second speed threshold, for example to ensure sufficiently good steerability or maneuverability when driving the vehicle in urban traffic.

The control device can carry out a safety check of the vehicle state and, if a safety-critical drive state is determined by means of the safety check, increase the axle rigidity of the at least one vehicle axle having the multi-chamber gas springs to the maximum possible axle rigidity value. A contribution for increasing the drive safety can thereby be achieved, to keep the vehicle stable, in particular with high lateral accelerations. The control device can compare the steering angle speed with a steering angle speed threshold with a safety check of the vehicle state, and, if the steering angle speed exceeds the steering angle speed threshold, recognize the safety-critical drive state. Such a safety-critical drive state is for example present if the driver initiates an evasion maneuver and thereby changes the steering angle very quickly. By recognizing this critical drive state and the increase of the axle rigidity, the driver is supported and the vehicle is kept as stable as possible with regard to the drive dynamics.

The steering angle speed threshold can thereby be dependent on parameters and in particular be determined in dependence on the longitudinal vehicle speed. With higher longitudinal vehicle speeds, a lower steering angle speed value is already sufficient, in order to conclude a safety-critical drive state, while with low longitudinal vehicle speeds, a larger steering angle speed threshold is established. A critical drive state can thus be determined according to the situation.

The above measures in connection with the safety check can also be carried out independently of the otherwise realized control or regulation of the gas spring system, and thus present an independent design of the gas spring system.

Other objects, advantages and novel features of the present invention will become apparent from the following detailed description of the invention when considered in conjunction with the accompanying drawings.

DETAILED DESCRIPTION OF THE DRAWINGS

Figure 1:
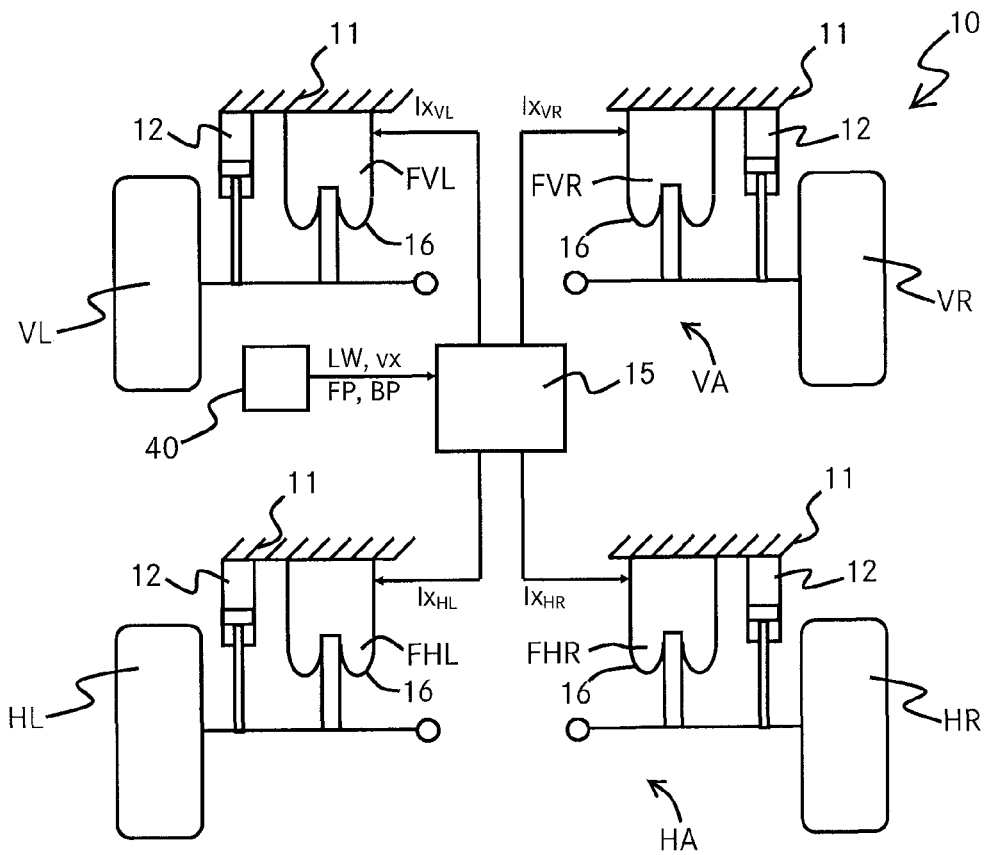
FIG. 1 is a schematic depiction of a vehicle with a gas spring system according to the invention.

FIG. 1 shows an embodiment of a gas spring system 10 of a vehicle (not shown) in a schematic depiction similar to a block diagram. The vehicle has a left front wheel VL and a right front wheel VR at a front axle VA, and a left rear wheel HL and a right rear wheel HR at a rear axle HA. A multi-chamber gas spring FVL, FVR, FHL, FHR is associated with at least the vehicle wheels of one of the two vehicle axles VA, HA and according to the example each of the vehicle wheels VL, VR, HL, HR, which suspend relative movements of the respectively associated vehicle wheel VL, VR, HL, HR with regard to the vehicle body 11. A damper 12 is further respectively provided between the vehicle wheels VL, VR, HL, HR and the vehicle body 11, which dampens relative movements between the respectively associated vehicle wheel VL, VR, HL, HR and the vehicle body 11. The damper 12 can be formed separately or can be integrated into the respective multi-chamber air spring FVL, FVR, FHL, FHR and is in particular designed as a hydraulic damper 12.

A control device 15 serves for the actuation of the multi-chamber gas springs FVL, FVR, FHL, FHR. The multi-chamber gas springs FVL, FVR, FHL, FHR have a gas-filled main chamber 17 (FIG. 2) cooperating with a rolling bellows 16 with a main chamber volume V1. During a relative movement of the associated vehicle wheel VL, VR, HL, HR and the vehicle body 11, the rolling bellows 16 is displaced, whereby the gas in the multi-chamber gas spring FVL, FVR, FHL, FHR is compressed or decompressed depending on the movement direction of the rolling bellows 16, such that the relative movement between the associated vehicle wheel VL, VR, HL, HR and the vehicle body 11 is suspended.

The spring rigidity CVL, CVR, CHL, CHR of the multi-chamber air spring FVL, FVR, FHL, FHR depends on the effective total volume, which is available during the rolling bellows movement for compression or decompression. With the multi-chamber gas spring FVL, FVR, FHL, FHR according to the invention, at least one auxiliary chamber can be added in a fluidic manner to the main chamber 17 as an additional volume or can again be separated from the main chamber 17. With the embodiment described here, the multi-chamber gas springs FVL, FVR, FHL, FHR respectively have a first auxiliary chamber 20, a second auxiliary chamber 21 and a third auxiliary chamber 22. The first auxiliary chamber 20 has a first auxiliary chamber volume V2, the second auxiliary chamber 21 has a second auxiliary chamber volume V3 and the third auxiliary chamber 22 has a third auxiliary chamber volume V4. It is thereby valid in the present case:

$$V2<V3<V4<V1.$$

The first auxiliary chamber 20 is connected to the main chamber 17 via a first connection channel 25, wherein a first connection valve 26 is arranged in the first connection channel 25, which can be activated in an electrical manner. Corresponding to this, the main chamber 17 is connected to the second auxiliary chamber 21 via a second connection channel 27, in which sits a second connection valve 28, and the main chamber 17 is connected to the third auxiliary chamber 22 via a third connection channel 29, in which is arranged a third connection valve 30. All three connection valves 26, 28, 30 can be activated independently of each other by the control device 15 and either close the corresponding connection channel 25, 27, 29 in a fluidic manner or open it in a fluidic manner, so that the respective auxiliary chamber 20, 21, 22 can be separated from or connected to the main chamber 17 in a fluidic manner.

The spring rigidity CVL, CVR, CHL, CHR of the multi-chamber gas spring FVL, FVR, FHL, FHR depends on how large the gas volume is that cooperates with the rolling bellows 16, which is to be called effective total volume VG. This effective total volume results from the sum of the main chamber volume V1 and the auxiliary chamber volumes V2, V3, V4 of those auxiliary chambers 20, 21, 22, which are connected to the main chamber 17 at the observed time.

If at least one of the auxiliary chambers 20, 21, 22 is connected to the main chamber 17 via the respective connection channel 25, 27, 29, a desired damping action can be adjusted by the choice of the cross section of the connection channel 25, 27, 29 and/or the opening cross section of the connection valve 26, 28, 30. During the displacement of the rolling bellows 16 during the spring compression or extension, the pressure first changes in the main chamber 17. Gas is thereby moved through the connection channels 25, 27, 29 which are open in a fluidic manner and the connection valves 26, 28, 30 arranged there in the open position are moved into the respective associated auxiliary chambers 20, 21, 22 or out of the respective associated auxiliary chamber 20, 21, 22, so as to equalize the pressure. The spring movement of the corresponding multi-chamber gas spring FVL, FVR, FHL, FHR is thereby dampened. The dampening adjustment of the damper 12 can take place in tune with the gas spring dampening which can be achieved by the choice of the cross section of the connection channels 25, 27, 29 and/or the opening cross section of the connection valves 26, 28, 30. A damper 12 with adjustable dampening can thereby be provided in particular.

Figure 2:
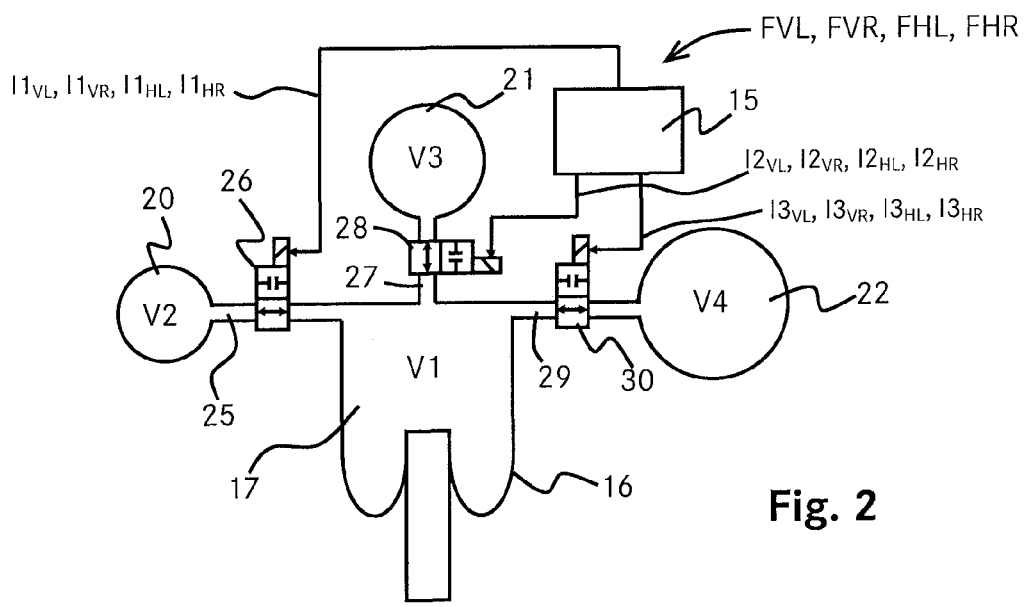
FIG. 2 is a schematic depiction of a multi-chamber gas spring of a gas spring system according to the invention.

As is shown in FIG. 2, the connection valves 26, 28, 30 are designed as switching valves. It would alternatively also be conceivable to design the connection valves 26, 28, 30 as proportional valves, so that the flow-through cross section of the respective connection channel 25, 27, 29 can be changed continuously between a completely closed and a completely open position.

The activation of the connection valves 26, 28, 30 takes place in an electrical manner by supplying current to the respective electromagnet of the connection valve 26, 28, 30. These currents I are shown in FIG. 1, wherein the index VL stands for the multi-chamber gas spring FVL associated with the left front wheel VL, the index VR for the multi-chamber gas spring FVR, associated with the right front wheel VR, the index HL for the multi-chamber gas spring FHL associated with the left rear wheel HL, and the index HR for the multi-chamber gas spring FHR associated with the right rear wheel VL. The letter "x" is a placeholder for three different currents of the three connection valves 26, 28, 30 of a multi-chamber gas spring FVL, FVR, FHL, FHR, as can also be seen in FIG. 2.

The steering angle LW and the longitudinal vehicle speed vx is transferred to the control device 15 via a sensor device 40 of the vehicle. Further parameters P, such as vehicle state parameters or environmental parameters can be supplied to the control device 15 via the sensor device 15. With the preferred embodiment of the gas spring system described here, a brake pedal actuation parameter and according to the example the brake pedal position BP, and a drive pedal actuation parameter and according to the example the drive pedal position FP are transferred to the control device 15 as vehicle state parameters.

The sensor data and parameters transferred to the control device 15 by the sensor device are nowadays available in vehicles and can be transferred to the control device 15 via a vehicle data bus system. It is obvious that further parameters can be transferred to the control unit, as for example the road surface friction value.

The function of the control device 15 of the gas spring system 10 is explained in detail in the following by means of FIGS. 3 and 4.

Figure 3:
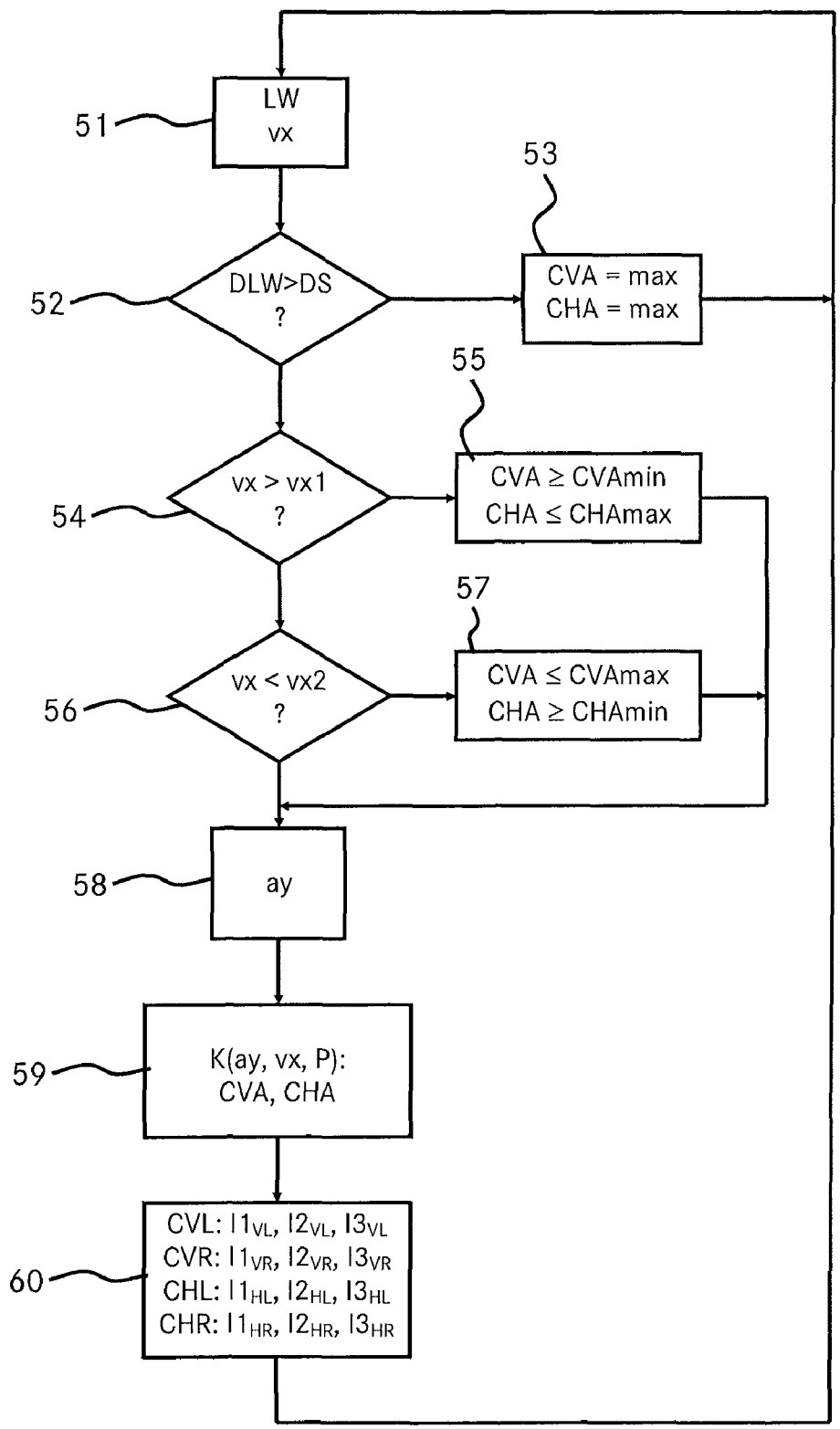
FIG. 3 is a flow diagram with a possibility of the control of the gas spring system according to the invention.

As is shown in FIG. 3, in a preferred embodiment of a method for controlling or regulating the gas spring system 10, the steering angle LW and the longitudinal vehicle speed vx is sensed in a first step 51. The steering angle speed DLW is determined from the steering angle LW by differentiation and compared to a steering angle speed threshold in a second step 52. The steering angle speed threshold DS does not have to be constant, but can be given in dependence on parameters, for example in dependence on the longitudinal vehicle speed vx. The second step 52 represents a safety check, where it is determined if a safety-critical drive state is present. If the steering angle speed DLW exceeds the steering angle speed threshold DS, a safety-critical drive state is recognized according to the example and the front axle rigidity CVA, and also the rear axle rigidity CHA, are increased to the respective maximum possible axle rigidity value. This is achieved in a third step 53 in that the effective total volume of all multi-chamber gas springs FVL, FVR, FHL, FHR is reduced to the main chamber volume V1, wherein all connection valves 26, 28, 30 are switched to their respective blocking position by the control device 15. The method starts again with the first step 51 after the third step 53.

If it was determined during the safety check in the second step 52 that the steering angle speed DLW does not exceed the steering angle speed threshold DS, the method is continued in the fourth step 54, in which the longitudinal vehicle speed vx is compared to a first speed threshold vx1. If the longitudinal vehicle speed vx exceeds the first speed threshold vx1, a limitation of the front axle rigidity CVA and of the rear axle rigidity CHA takes place in the fifth step 55, to give the vehicle a sufficiently large direction or drive stability. A minimum front axle rigidity CVAmin is thereby fixed for the front axle rigidity CVA, which cannot be undercut. The minimum front axle rigidity CVAmin is thereby larger than the smallest possible front axle rigidity CVa which can be adjusted. For the rear axle rigidity CHA, a maximum rear axle rigidity CHAmax is fixed in the fifth step 55, which cannot be exceeded. The maximum rear axle rigidity CHAmax is thereby smaller than the largest possible rear axle rigidity CHA which can be adjusted. By these restrictions of the axle rigidities CVA, CHA in the fifth step 55, a calm stable drive behavior is ensured for higher longitudinal vehicle speeds vx, which are larger than the first speed threshold vx1, for example for drives on highways with large longitudinal speeds.

If the longitudinal vehicle speed vx is however not larger than the first speed threshold vx1, a sixth step 56 follows the fourth step 54, in which the longitudinal vehicle speed vx is compared to a second speed threshold vx2. If the longitudinal vehicle speed vx falls below the second speed threshold vx2, a limitation of the axle rigidities CVA, CHA takes place again in a seventh step 57 of the method, but, in contrast to the fifth step 55 in such a manner that a minimum of agility and thereby a sort of rotation-friendly drive behavior is passed to the vehicle. For this, a maximum front axle rigidity CVAmax is fixed in the seventh step 57 for the front axle rigidity CVA, which cannot be exceeded. A minimum rear axle rigidity CHAmin is simultaneously fixed for the rear axle rigidity CHA, which cannot be undercut. The maximum front axle rigidity CVAmax is thereby smaller than the largest possible front axle rigidity, while the minimum rear axle rigidity CHAmin is larger than the smallest possible rear axle rigidity.

With small longitudinal vehicle speeds vx below the second speed threshold vx2, for example with urban traffic, the vehicle can be maneuvered very easily and is agile.

If the longitudinal vehicle speed vx does not fall below the second speed threshold vx2 or if a limitation of the axle rigidities CVA, CHA was carried out in one of the steps 55 or 57, the method is continued in an eighth step 58, in which a guide value is determined, which serves as a basis for the calculation of a front axle target rigidity CVasoll and a rear axle target rigidity CHAsoll. A guide lateral acceleration ay is calculated as a guide value from the steering angle LW and the longitudinal vehicle speed vx. This calculated guide lateral acceleration ay precedes in time the actual lateral acceleration effectively acting on the vehicle, so that the target axle rigidities CVAsoll, CHAsoll determined therefrom can already be determined and adjusted prior to the presence of the effective actual lateral acceleration. It is thus possible to adapt and to adjust the axle rigidities CVA, CHA to the actual lateral accelerations to be expected before this actually occurs. The drive behavior of the vehicle when passing through a curve can be improved considerably in this manner.

The front axle target rigidity CVAsoll and the rear axle target rigidity CHAsoll is determined in a ninth step 59 by means of a characteristic field K. The characteristic field thereby depends on the guide value and according to the example on the guide lateral acceleration ay, the longitudinal vehicle speed vx and further parameters P, as vehicle state parameters or environmental parameters. According to the example, during the determination of the target rigidities CVAsoll, CHAsoll, the brake pedal position BP and the drive pedal position FP are considered, which serve as a measure for the actual longitudinal acceleration of the vehicle. The characteristic field K is determined in such a manner that the vehicle shows the desired behavior in all drive situations. The characteristic field can be determined and tuned empirically by simulation and in drive experiments. The exact adjustment thereby depends if a tendency to agile, sporty or rather a calm, comfortable drive behavior is desired for a desired vehicle type. The drive behavior can be adjusted by means of the gas spring system according to the invention in dependence on the guide lateral acceleration ay, the longitudinal vehicle speed vx and the parameters P in large ranges in dependence on the drive situation.

After the front axle target rigidity CVAsoll and the rear axle target rigidity CHAswoll have been determined in the ninth step 59, the spring rigidities CVL, CVR of the multi-chamber gas springs FVL, FVR are now adjusted at the front axle VA and the spring rigidities CHL, CHR of the multi-chamber gas springs FHL, FHR at the rear axle HA corresponding to the determined target axle rigidities CVAsoll and CHAsoll in a tenth step 60. The adjustment thereby takes place by the activation of the connection valves 26, 28, 30 of the respective multi-chamber gas springs FVL, FVR, FHL, FHR. The control device 15 supplies the respective connection valve 26, 28, 30 of the multi-chamber gas springs with current for this in such a manner that it takes up the desired switching position.

The spring rigidities CVL, CVR, CHL, CHR are thereby adapted in a given sequence in stages by switching the respective connection valves 26, 28, 30 until the desired front axle target rigidity CVAsoll or the desired rear axle target axle rigidity CHAsoll is reached. The spring rigidities CVL, CVR, CHL, CHR thereby change in a given sequence in stages, as is explained in the following by means of FIG. 4.

For the adaptation of the axle rigidity CVA, CHA to the respective target axle rigidity CVAsoll, CHAsoll, the spring rigidity CVL, CHL or CHL, CHR of the multi-chamber gas springs FVL, FVR or FVR, FHR is initially adapted, which lies on the curve inner side. The curve inner side of the vehicle is thereby the side which is arranged in dependence on the sensed steering angle at the curve inner side. In other words, the curve inner side is the vehicle side which lies on the inside seen in the direction of the calculated guide lateral acceleration ay. After the changing of the spring rigidity CVL, CHL or CVR, CHR of the multi-chamber gas springs FVL, FVR or FVR, FHR at the curve inner side in a first adaptation stage, the spring rigidity CVR, CHR or CVL, CHL, of the respective axle-identical multi-chamber gas spring in a second adaptation stage is changed, so as to adapt the respective axle rigidity CVA, CHA to the target rigidity CVA soll, CHAsoll. The spring rigidities CVL, CVR or CHL, CHR of the multi-chamber gas springs FVL, FVR or FHL, FHR of a vehicle axle VA or HA are changed in stages in an alternating fashion until the axle rigidity CVA, CHA at the respective axle VA or HA corresponds to the respective target axle rigidity CVAsoll, CHAsoll.

Figure 4:
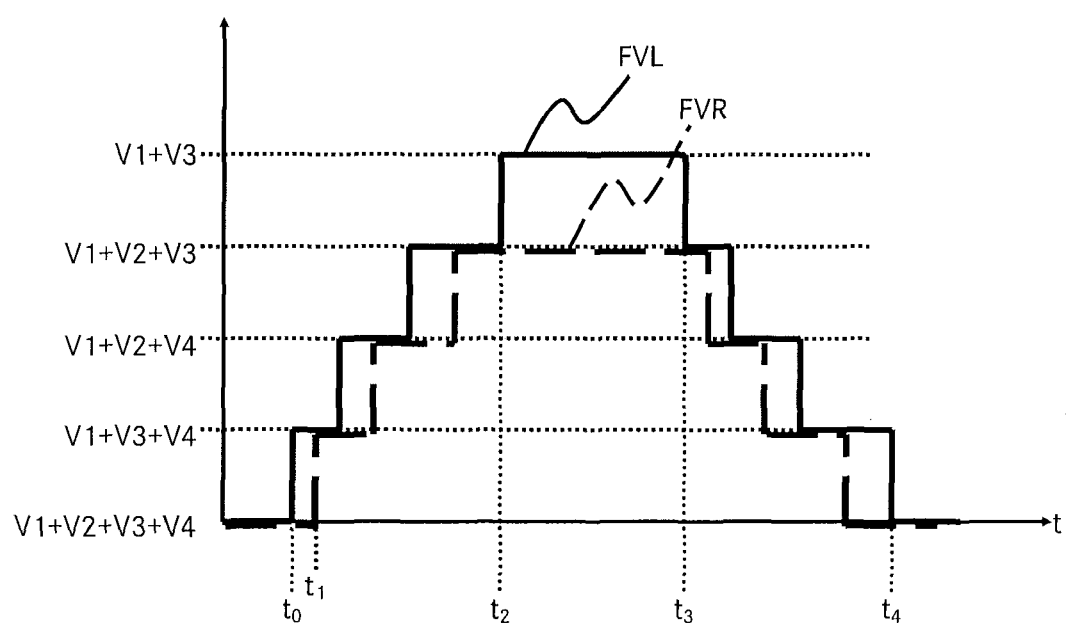
FIG. 4 shows an exemplary chronological sequence of the switching state of the multi-chamber gas springs arranged at the front axle when passing through a left turn.

This adaptation in stages in an alternating fashion of the spring rigidities CVL, CVR, CHL, CHR, starting at the multi-chamber gas springs of the curve inner side of the vehicle, is shown in FIG. 4 with the example of the front axle VA and its two multi-chamber gas springs FVL, FVR by means of a left turn which is passed through. The respective effective total volume cooperating with the rolling bellows 16 is thereby plotted over time for both multi-chamber gas springs FVL, FVR. The respective effective total volume is fixed by the switching states of the connection valves 26, 28, 30 of the respective multi-chamber gas springs FVL, FVR. The larger the effective total volume VG, the lower is the spring rigidity of the multi-chamber gas spring FVL, FVR.

The effective total volume VG of the front left multi-chamber gas spring FVL is depicted in FIG. 4 by the continuous line, whereas the effective total volume VG of the front right multi-chamber gas spring is shown in a dashed line. As a starting situation before a first time t0, the vehicle drives straight on, wherein the maximum possible effective total volume VG is adjusted with both multi-chamber gas springs FVL, FVR of the front axle, and the front axle rigidity CVA thus takes on its smallest possible value. The longitudinal vehicle speed vx has a value between the first speed threshold vx1 and the second speed threshold vx2, so that the front axle rigidity CVA and thus the spring rigidities CVL, CVR of the two multi-chamber gas springs FVL, FVR of the front axle are not limited. According to the example, the first speed threshold vx1 is approximately 80-120 km/h and the second speed threshold vx2 approximately 40-60 km/h. It is however also possible to only give one speed threshold by the choice vx1=vx2.

At the time $t_0$, the driver starts to steer into a left turn, wherein the steering angle speed lies below the steering angle speed threshold DS. The guide lateral acceleration ay is determined on the basis of the steering angle LW and the longitudinal vehicle speed vx. Subsequently, the front axle target rigidity CVAsoll is determined with the help of the characteristic field K, and the spring rigidities CVL and CVR are adjusted by switching the connection valves 26, 28, 30 of the two multi-chamber gas springs FVL, FVR corresponding to FIG. 4.

At the time $t_0$, the first connection valve 26 of the front left multi-chamber gas spring FVL is first switched to its blocking position, so that the main chamber 17 is connected only to the second auxiliary chamber 21 and the third auxiliary chamber 22. Subsequently, the first switching valve 26 of the front right multi-chamber gas spring FVR is also switched to its blocking position at a time $t_1$, so that the main chamber 17 is connected only to the second auxiliary chamber 21 and the third auxiliary chamber 22 in a fluidic manner with the front right multi-chamber gas spring FVR. During the further course, the effective total volumes VG of the front left multi-chamber gas spring FVL and of the front right multi-chamber gas spring FVR are reduced in stages in an alternating fashion, until the effective total volume VG of the front left multi-chamber gas spring FVL consists of only the main chamber volume V1 and the second auxiliary chamber volume V3 at a time $t_2$, that is, with the front left multi-chamber gas spring FVL, the first and the third connection valve 26, 30 are in the blocking position, while the second connection valve 28 takes up its open position. At this third time $t_2$, the effective total volume of the front right multi-chamber gas spring FVR results from its main chamber volume V1, the first auxiliary chamber volume V2 and the second auxiliary chamber volume V3. The first and the second connection valve 26, 28 are accordingly in their open positions with the front right multi-chamber gas spring FVR, and only the third connection valve 30 in the blocking position. At this time $t_2$, the front axle rigidity CVA corresponds to the front axle target rigidity CVAsoll, such that the front axle rigidity CVA does not have to be increased by the separation of a further auxiliary chamber volume. The vehicle now passes through the curve with a constant steering angle LW and a constant longitudinal vehicle speed vx, whereby initially no further change of the front axle rigidity becomes necessary.

From a time $t_3$, the driver starts traveling out of the left turn and reduces the steering angle LW, whereby the guide lateral acceleration ay decreases. The resulting front axle target rigidity CVAsoll reduces, so that from this time $t_3$, again starting with the curve-interior, front left multi-chamber gas spring FVL auxiliary chamber volumes of the two multi-chamber gas springs FVL, FVR of the front axle VA are alternatively added, so as to adapt the front axle rigidity CVA to the decreasing front axle target rigidity CVAsoll. This takes place in an alternating manner on the one and the other vehicle side, until the vehicle again drives straight ahead at a time $t_4$ and the front axle rigidity CVA takes on its minimum value, as all auxiliary chambers 20, 21, 22 of the two multi-chamber gas springs FVL, FVR of the front axle VA are connected to the respective main chamber 17 in a fluidic manner.

Analogously to the switching processes of the front axle VA, the spring rigidities CHL, CHR of the two multi-chamber gas springs FHL, FHR of the rear axle HA are changed in stages in an alternating fashion, starting with the multi-chamber gas spring at the curve inner side of the vehicle, so as to adapt the rear axle rigidity CHA to the rear axle target rigidity CHAsoll. One can thereby adjust a rigidity difference in a fixed manner or in dependence on the drive situation between the front axle rigidity CVA and the rear axle rigidity CHA, so as to achieve a desired static or dynamic axle load distribution.

The time delay between the switching of one of the connection valves 26, 28, 30 at the one multi-chamber gas spring FVL, FVR or FHL, FHR on the one vehicle side and of the switching of one of the connection valves 26, 28, 30 of the respective axle-identical multi-chamber gas spring FVR, FVL or FHR, FHL is not given in a fixed manner, as can also be seen in FIG. 4, but depends on the amount of the guide value and/or on the steering angle speed DLW and/or on further parameters P. The switching times result dynamically from the determination of the target axle rigidities CVAsoll, CHAsoll on the basis of the characteristic field K.

The connection valves 26, 28, 30 can be designed as closed valves without current, so that the connection valves 26, 28, 30 close automatically with an error in the gas spring system 10, which leads to a loss of power. The axle rigidity is thereby increased to a maximum in the case of an error.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle gas spring system comprising a multi-chamber gas spring associated with each vehicle wheel of at least one vehicle axle for the suspension of relative movement between the vehicle wheel and a vehicle body; wherein:
   each multi-chamber gas spring comprises a main chamber filled with a gas and cooperating with a rolling bellows and at least one auxiliary chamber filled with gas connectable to the main chamber via a connection channel;
   an actuatable connection valve is arranged in a connection channel by which the main chamber and the at least one auxiliary chamber can be connected to, and separated from, each other in a fluidic manner to change spring rigidity of the multi-chamber gas spring;
   a control device determines a target axle rigidity dependent upon a guide value determined from longitudinal vehicle speed and a steering angle for said at least one vehicle axle, and actuates the connection valves of the multi-chamber gas springs of said at least one vehicle axle for adjusting axle rigidity of this vehicle axle corresponding to the target axle rigidity; and
   the spring rigidity of the multi-chamber gas spring located on an inner side of the vehicle, relative to a curve traversed by the vehicle, is first changed by the control device.

2. The gas spring system according to claim 1, wherein a multi-chamber gas spring is associated with each vehicle wheel.

3. The gas spring system according to claim 1, wherein:
   each multi-chamber gas spring has a plurality of auxiliary chambers with gas volumes having different sizes; and
   said auxiliary chambers can respectively be connected in a fluidic manner to, or separated from, the main chamber via a separate connection channel with respectively one connection valve.

4. The gas spring system according to claim 1, wherein the control device calculates a guide lateral acceleration from the longitudinal vehicle speed and steering angle, which acceleration serves as guide value for determining the target axle rigidity.

5. The gas spring system according to claim 1, wherein the control unit determines the target axle rigidity based on the guide value with the help of a characteristic field.

6. The gas spring system according to claim 5, wherein the control unit determines the target axle rigidity in dependence on at least one of particular vehicle state parameters and environmental parameters.

7. The gas spring system according to claim 6, wherein at least one of a brake pedal actuation parameter, a drive pedal actuation parameter, a wheel slip parameter, the steering angle speed, spring paths, and spring speeds are used as vehicle state parameters.

8. The gas spring system according to claim 1, wherein:
   the control device compares the longitudinal vehicle speed with a first speed threshold; and if the longitudinal vehicle speed exceeds the first speed threshold, the control device fixes a minimum front axle rigidity for the front axle rigidity, which is larger than the smallest possible front axle rigidity, and fixes a maximum rear axle rigidity for the rear axle rigidity, which is smaller than the largest possible rear axle rigidity.

9. The gas spring system according to claim 1, wherein:
the control device compares the longitudinal vehicle speed with a second speed threshold; and
if the longitudinal vehicle speed falls below the second speed threshold, the control device fixes a maximum front axle rigidity for the front axle rigidity, which is smaller than the largest possible front axle rigidity, and fixes a minimum rear axle rigidity for the rear axle rigidity, which is larger than the smallest possible rear axle rigidity.

10. The gas spring system according to claim 1, wherein:
the control device performs a safety check of the drive state; and
if a safety-critical drive state is determined by means of the safety check, the control device increases the front axle rigidity and the rear axle rigidity respectively to a maximum possible axle rigidity value.

11. The gas spring system according to claim 10, wherein:
the control device compares the steering angle speed with a steering angle speed threshold during the safety check of the vehicle state; and
if the steering angle speed exceeds the steering angle speed threshold, the control device recognizes a safety-critical driving state.

12. The gas spring system according to claim 11, wherein the steering angle speed threshold is determined based on the longitudinal vehicle speed.

13. A gas spring system of a vehicle, wherein a multi-chamber gas spring associated with each vehicle wheel of at least one vehicle axle for the suspension of relative movement between the vehicle wheel and a vehicle body; wherein:
- each multi-chamber gas spring comprises a main chamber filled with a gas and cooperating with a rolling bellows and at least one auxiliary chamber filled with gas connectable to the main chamber via a connection channel;
- an actuatable connection valve is arranged in a connection channel by which the main chamber and the at least one auxiliary chamber can be connected to, and separated from, each other in a fluidic manner to change spring rigidity of the multi-chamber gas spring;
- a control device determines a target axle rigidity for the at least one vehicle axle dependent upon a guide value determined from longitudinal vehicle speed and a steering angle, and actuates the connection valves of the multi-chamber gas springs of said at least one vehicle axle for adjusting axle rigidity corresponding to the target axle rigidity; and
- when adapting the axle rigidity to the target axle rigidity the spring rigidities of the multi-chamber gas springs of this vehicle axle are adjusted in stages to the target axle rigidity in a time-alternating fashion with regard to the different sides of the axle.

* * * * *